H. E. COFFIN.
EXPLOSION ENGINE.
APPLICATION FILED APR. 20, 1911.
1,024,619.
Patented Apr. 30, 1912.
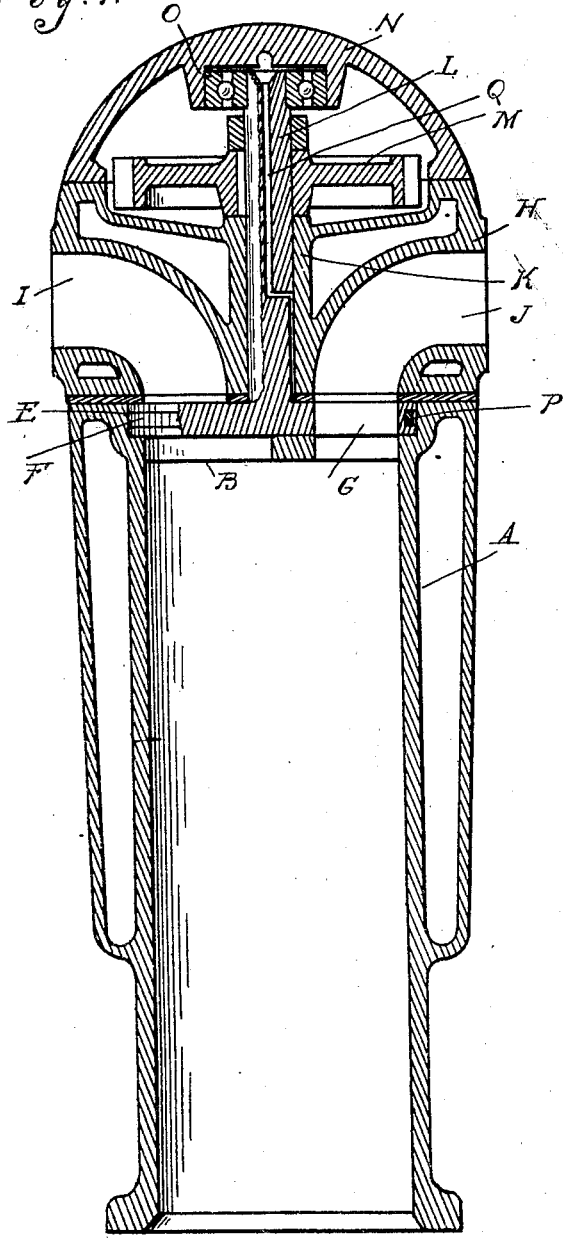
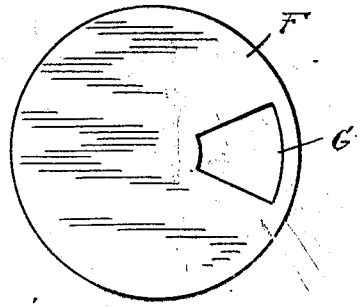
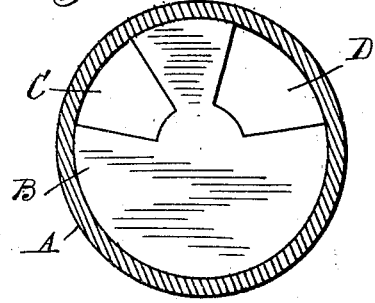
Witnesses
Inventor
Howard E. Coffin
By
Atty's

UNITED STATES PATENT OFFICE.

HOWARD E. COFFIN, OF DETROIT, MICHIGAN.

EXPLOSION-ENGINE.

1,024,619.     Specification of Letters Patent.     Patented Apr. 30, 1912.

Application filed April 20, 1911. Serial No. 622,291.

*To all whom it may concern:*

Be it known that I, HOWARD E. COFFIN, a citizen of the United States of America, residing at Detroit, in the county of Wayne and State of Michigan, have invented certain new and useful Improvements in Explosion-Engines, of which the following is a specification, reference being had therein to the accompanying drawings.

The invention relates to explosion engines of the type in which rotary valves are employed, and the invention consists in the construction as hereinafter set forth.

In the drawings,—Figure 1 is a vertical central section through the cylinder and head of the engine; Fig. 2 is a plan view of the valve disk; and Fig. 3 is a plan of the valve seat with the cylinder in section.

A is the cylinder of the engine provided at its upper end with an integral head B having inlet and exhaust ports C and D extending therethrough.

E is a recess formed in the outer face of the head in which a rotary disk valve F is placed, said valve having a port G which alternately registers with the ports C and D.

H is a detachable head for the cylinder which has inlet and exhaust passages I and J arranged to register with the ports C and D. This head is also provided with a central journal bearing K for the stem L of the rotary valve, and a water jacket is formed integral with the head which surrounds this journal bearing and the passages I and J.

M is a gear wheel upon the stem L forming a member of the drive train (not shown), N is a detachable cap for the head H housing the gear wheel, and O is a bearing on said cap for the outer end of the stem L.

With the construction as described it will be observed that the rotary valve disk F is arranged between two parallel seats or bearing faces, one formed by the integral head B and the other by the detachable head H. The inner or integral head serves to protect the valve from heat at pressure of explosion, while the outer or detachable head with its water jacket absorbs the heat conducted through the inner head and valve. To avoid leakage around the valve, the periphery of the latter is provided with an annular recess in which a packing ring P is placed. This will intercept any leakage from the ports C and D around the periphery of the disk and also protects the joint between the cylinder and the detachable head H.

In use the engine may be constructed in units of any desired number of cylinders, the gears M intermeshing with each other. The valve disks are timed to open the ports C and D of the cylinders in proper sequence and a liquid seal between the valve and its seat is maintained by feeding lubricant through the axial passage Q in the stem to the bearing K and then distributing it by centrifugal action from the face of the valve.

As shown in Fig. 1 the outer edge of the port G is of a radius equal to that of the cylinder bore. This enlarges the port area within a given angle and is possible by reason of the fact that the valve is of larger diameter than the cylinder bore. Thus the inlet and exhaust passages may be larger and are freer from restrictions than the valves having no greater diameter than the cylinder.

What I claim as my invention is:

1. In an explosion engine, the combination of a cylinder having an integral head, and a detachable head with registering ports therein, of a rotary valve disk arranged between said integral and detachable heads.

2. In an explosion engine, the combination with a cylinder having an integral head, and a detachable head with registering ports therein, a valve disk arranged in a recess in said integral head and having opposed bearing faces on said head and the detachable head.

3. In an explosion engine, the combination with a cylinder having an integral head with a recess in its outer face, of a valve disk located in said recess and provided with a port for registering with the ports in said head, and a detachable head having a central journal bearing for the stem of said valve.

4. In an explosion engine, the combination with a cylinder having an integral ported head provided with a recess in its outer face, a valve disk located in the recess in said head, a packing ring in the periphery of said disk engaging the peripheral wall of said recess, a detachable head having ports registering with said integral head, and a rotary stem for said valve disk passing through said detachable head and journaled therein.

5. In an explosion engine, the combination with a cylinder having an integral ported head with a recess in its outer face, of a circular valve disk located in said recess, a detachable head secured to said cylinder adjacent to the opposite face of said valve disk and provided with a central journal bearing, a rotary stem for said valve disk passing outward through said journal bearing, a drive wheel for said stem, and a detachable cap for housing said drive wheel and stem secured to said detachable head.

6. In an explosion engine, the combination with a cylinder having a ported head of a rotary disk valve of greater diameter than such cylinder and having a port extending outward to the full radius of the cylinder bore.

In testimony whereof I affix my signature in presence of two witnesses.

HOWARD E. COFFIN.

Witnesses:
L. M. CARLE,
G. L. PERRY.